United States Patent
Uchida et al.

(10) Patent No.: US 10,080,357 B2
(45) Date of Patent: Sep. 25, 2018

(54) INSECT ATTRACTANT LIGHTING METHOD AND INSECT ATTRACTANT LIGHTING SYSTEM

(75) Inventors: Tatsukiyo Uchida, Osaka (JP); Makoto Yamada, Osaka (JP); Minoru Ishii, Osaka (JP); Norio Hirai, Osaka (JP)

(73) Assignees: PANASONIC CORPORATION, Osaka (JP); OSAKA PREFECTURE UNIVERSITY PUBLIC CORPORATION, Osaka (JP)

( * ) Notice: Subject to any disclaimer, the term of this patent is extended or adjusted under 35 U.S.C. 154(b) by 742 days.

(21) Appl. No.: 13/392,337

(22) PCT Filed: Aug. 26, 2010

(86) PCT No.: PCT/JP2010/064502
§ 371 (c)(1),
(2), (4) Date: Mar. 27, 2012

(87) PCT Pub. No.: WO2011/024907
PCT Pub. Date: Mar. 3, 2011

(65) Prior Publication Data
US 2012/0176765 A1    Jul. 12, 2012

(30) Foreign Application Priority Data

Aug. 26, 2009  (JP) ................................ 2009-195957
Jul. 27, 2010  (JP) ................................ 2010-168675

(51) Int. Cl.
*A01M 1/04*   (2006.01)
*A01M 29/10*  (2011.01)
*A01M 1/14*   (2006.01)

(52) U.S. Cl.
CPC .............. *A01M 1/04* (2013.01); *A01M 1/145* (2013.01); *A01M 29/10* (2013.01)

(58) Field of Classification Search
CPC ........ A01M 1/04; A01M 29/10; A01M 29/00; A01M 29/28; A01M 29/08
(Continued)

(56) References Cited

U.S. PATENT DOCUMENTS 3,931,695 A * 1/1976 Widmayer ............. A01G 7/045
                                                         47/17
4,146,993 A * 4/1979 Freeman, Sr. ......... A01G 7/045
                                                         47/17
(Continued)

FOREIGN PATENT DOCUMENTS

JP          06046685 A  *  2/1994
JP          11192044 A  *  7/1999
(Continued)

OTHER PUBLICATIONS

Translation of JP2001-28947.*
(Continued)

*Primary Examiner* — Darren W Ark
(74) *Attorney, Agent, or Firm* — Greenblum & Bernstein, P.L.C.

(57) ABSTRACT

In an insect pest attraction lighting system which irradiates a field with attraction light for attracting insect pests to keep the insect pests away from a plant, an effect of protection against diurnal insect pests is improved. An insect pest attraction lighting system 1 includes: a setting unit 2 which sets, as an operating time zone, an arbitrary time zone during nighttime; an artificial sunlight source unit 3 which irradiates the entirety of an interior of a plastic greenhouse H1 with artificial sunlight which does not include wavelength components of 500 to 600 nm, in the operating time zone; and an attraction light source unit 4 which irradiates a portion of the interior of the plastic greenhouse H1 with attraction light in the operating time zone. The irradiation of the artificial sunlight during nighttime increases the activity (Continued)

of diurnal insect pests B1, and the attraction light attracts the activity-increased diurnal insect pests B1, whereby the activity-increased diurnal insect pests B1 can be kept away from plants P1. Thus, protection against the diurnal insect pests B1 can positively be provided. In addition, since the artificial sunlight does not include light in a wavelength range of 500 to 600 nm which is reflected by the plants P1, it is made difficult for the diurnal insect pests B1 to visually recognize the plants P1, and therefore, an effect of protection against insects is enhanced further.

10 Claims, 13 Drawing Sheets

(58) Field of Classification Search
USPC ....... 43/113; 47/1.01 R, 17, 58.1 R, 58.1 LS; 362/563
See application file for complete search history.

(56) References Cited

U.S. PATENT DOCUMENTS

| | | | | |
|---|---|---|---|---|
| 4,982,100 A * | 1/1991 | Harding, Jr. | ......... | A01M 29/08 250/493.1 |
| 5,012,609 A * | 5/1991 | Ignatius | ................. | A01C 1/00 47/1.01 R |
| 5,255,468 A * | 10/1993 | Cheshire, Jr. | ......... | A01M 1/023 43/113 |
| 5,269,093 A * | 12/1993 | Horaguchi | ............. | A01G 7/045 47/58.1 R |
| 5,301,456 A * | 4/1994 | Jobin et al. | ..................... | 43/113 |
| 5,343,652 A * | 9/1994 | Johnson | ....................... | 43/132.1 |
| 5,813,166 A * | 9/1998 | Wigton et al. | ................. | 43/113 |
| 5,857,282 A * | 1/1999 | Odintsov | ....................... | 43/113 |
| 6,625,918 B2 * | 9/2003 | Bhullar | ............................. | 43/1 |
| 6,718,681 B2 * | 4/2004 | Bhullar | ............................. | 43/1 |
| 6,921,182 B2 * | 7/2005 | Anderson, Jr. | ......... | A01G 7/045 362/230 |
| 7,516,572 B2 * | 4/2009 | Yang et al. | ..................... | 43/107 |
| 7,774,979 B2 * | 8/2010 | Hurst | ..................... | A01G 7/045 47/58.1 LS |
| 7,784,215 B2 * | 8/2010 | Cohnstaedt et al. | ............. | 43/113 |
| 7,905,052 B2 * | 3/2011 | Hurst | ..................... | A01G 7/045 47/17 |
| 7,937,887 B2 * | 5/2011 | Child | ............................. | 43/113 |
| 8,299,445 B2 * | 10/2012 | Yamada et al. | ......... | 250/455.11 |
| 8,327,577 B2 * | 12/2012 | Liang | ..................... | A01M 1/04 43/113 |
| 8,458,954 B2 * | 6/2013 | Yamada | ................. | A01G 7/045 47/58.1 LS |
| 8,549,787 B2 * | 10/2013 | Aikala | ................. | A01G 7/045 47/1.01 R |
| 8,579,465 B2 * | 11/2013 | Yamada | ................. | A01G 7/045 47/17 |
| 8,844,192 B2 * | 9/2014 | Yamada et al. | ................. | 43/113 |
| 8,847,514 B1 * | 9/2014 | Reynoso | ................. | A01G 7/045 47/58.1 LS |
| 8,850,743 B2 * | 10/2014 | Aikala | ................. | A01G 7/045 47/1.01 R |
| 9,131,645 B2 * | 9/2015 | Karpinski | ............. | A01G 7/045 |
| 9,137,874 B2 * | 9/2015 | Maxik | ..................... | H05B 37/02 |
| 2003/0009933 A1 * | 1/2003 | Yoneda | ................. | A01G 7/045 47/1.01 R |
| 2005/0172542 A1 * | 8/2005 | Rose, Sr. | ......................... | 43/113 |
| 2006/0218851 A1 * | 10/2006 | Weiss et al. | ..................... | 43/113 |
| 2007/0058368 A1 * | 3/2007 | Partee | ..................... | A01G 7/045 362/231 |
| 2007/0289207 A1 * | 12/2007 | May | ......................... | A01G 9/16 47/17 |
| 2008/0134568 A1 * | 6/2008 | Cowan et al. | .................. | 43/113 |
| 2009/0272029 A1 * | 11/2009 | Aiking | ..................... | A01G 7/04 47/1.43 |
| 2009/0288333 A1 * | 11/2009 | Johnston | ............... | A01M 1/145 43/113 |
| 2010/0020536 A1 * | 1/2010 | Bafetti | .................. | F21V 23/003 362/231 |
| 2010/0071257 A1 * | 3/2010 | Tsai | ............................... | 43/113 |
| 2010/0277078 A1 * | 11/2010 | Morton | .................. | A01G 7/045 315/152 |
| 2011/0030267 A1 * | 2/2011 | Nolen et al. | ..................... | 43/113 |
| 2011/0153053 A1 * | 6/2011 | Kim | ..................... | A01G 9/246 47/17 |
| 2011/0209400 A1 * | 9/2011 | Rooymans | ............. | A01G 7/045 47/58.1 LS |
| 2011/0296740 A1 | 12/2011 | Yamada et al. | | |
| 2012/0032096 A1 * | 2/2012 | Marka | .................. | A01M 29/10 250/492.1 |
| 2012/0124903 A1 * | 5/2012 | Takeuchi | ............... | A01G 7/045 47/58.1 LS |
| 2012/0210637 A1 * | 8/2012 | Kamahara | ............. | A01G 7/045 47/17 |
| 2013/0283671 A1 * | 10/2013 | Czokajlo et al. | ............... | 43/113 |
| 2013/0298445 A1 * | 11/2013 | Aoki et al. | .................... | 43/132.1 |
| 2013/0301258 A1 * | 11/2013 | Aoki et al. | .................... | 362/231 |
| 2014/0373442 A1 * | 12/2014 | Aikala | .................. | A01G 7/045 47/58.1 LS |
| 2015/0075069 A1 * | 3/2015 | Ichihashi | .................. | F21V 9/14 47/17 |
| 2016/0262313 A1 * | 9/2016 | Szeto | ..................... | A01M 29/10 |
| 2017/0006848 A1 * | 1/2017 | Barroso | ................. | A01M 29/10 |

FOREIGN PATENT DOCUMENTS

| | | | |
|---|---|---|---|
| JP | H11-192044 A | | 7/1999 |
| JP | 2001028947 A | * | 2/2001 |
| JP | 2003274839 A | * | 9/2003 |
| JP | 2004-081100 | | 3/2004 |
| JP | 2004081100 A | * | 3/2004 |
| JP | 2004261180 A | * | 9/2004 |
| JP | 2005-151868 | | 6/2005 |
| JP | 2005-151868 A | | 6/2005 |
| JP | 2007000102 A | * | 1/2007 |
| JP | 2007109678 A | * | 4/2007 |
| JP | 2007-143429 | | 6/2007 |
| JP | 2007-143429 A | | 6/2007 |
| JP | 2007312631 A | * | 12/2007 |
| JP | 2008118953 A | * | 5/2008 |
| JP | 2008154541 A | * | 7/2008 |
| JP | 2009261267 A | * | 11/2009 |
| JP | 2010068754 A | * | 4/2010 |
| JP | 2010252671 A | * | 11/2010 |
| JP | 2011212011 A | * | 10/2011 |
| WO | WO 2009040528 A1 | * | 4/2009 ............ A01M 1/145 |
| WO | WO 2011115123 A1 | * | 9/2011 ............ A01G 7/045 |
| WO | WO 2011033177 A4 | * | 2/2012 ............ A01G 7/045 |

OTHER PUBLICATIONS

Translation of JP2007-102.*
Translation of JP2007-312631.*
Office Action issued in European Patent Office (EPO) Counterpart Patent Appl. No. 10811956.1, dated Oct. 16, 2017.

* cited by examiner

FIG. 11A  <ARTIFICIAL SUNLIGHT SOURCE UNITS AND ATTRACTION LIGHT SOURCE UNITS>
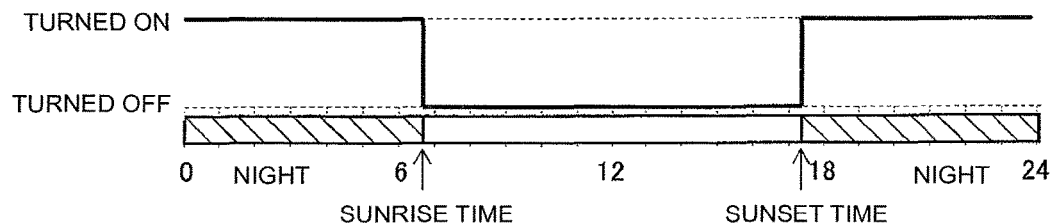
FIG. 11B
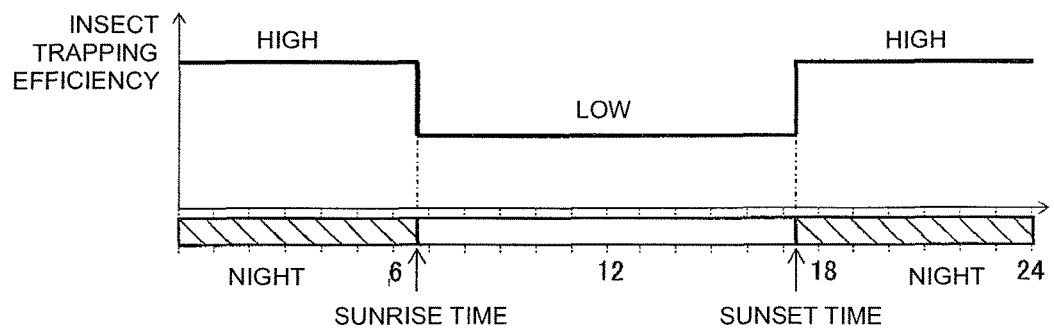
FIG. 12
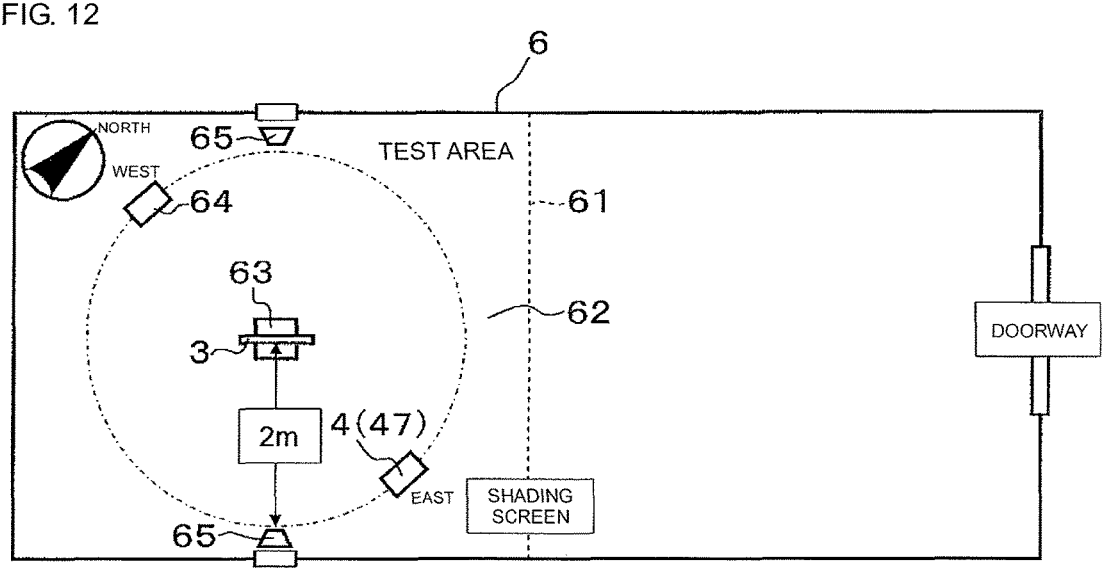

FIG. 17A  <ARTIFICIAL SUNLIGHT SOURCE UNITS AND ATTRACTION LIGHT SOURCE UNITS>
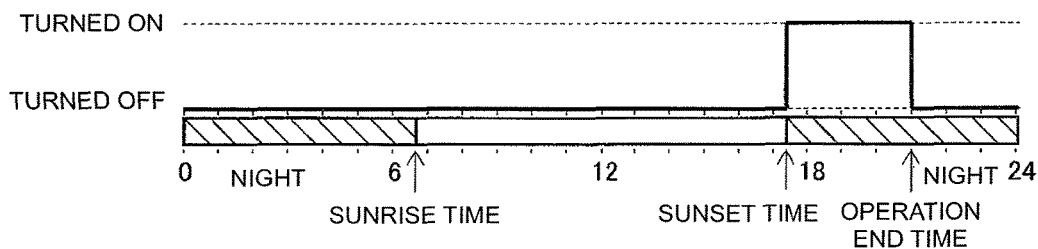
FIG. 17B
ACTIVITY RHYTHM
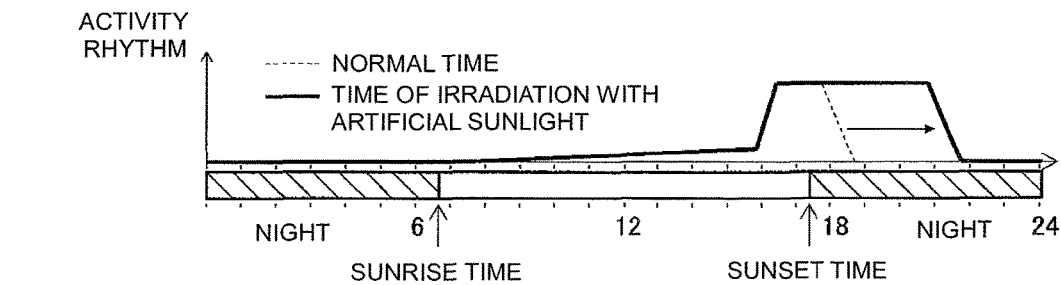
FIG. 17C
INSECT TRAPPING EFFICIENCY
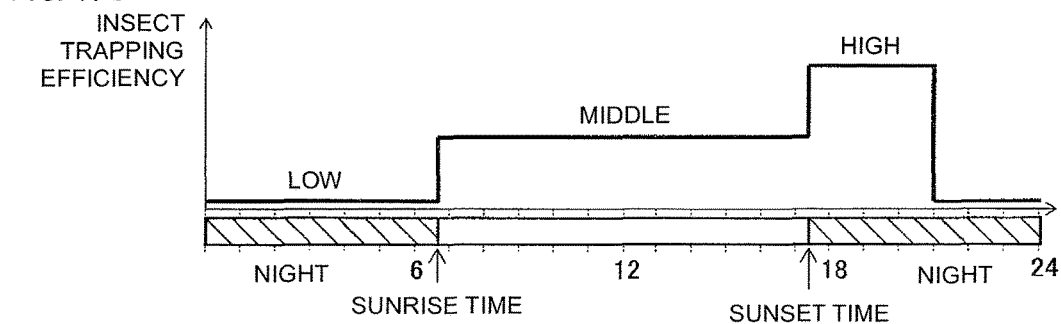

INSECT ATTRACTANT LIGHTING METHOD AND INSECT ATTRACTANT LIGHTING SYSTEM

TECHNICAL FIELD

The present invention relates to an insect pest attraction lighting method and an insect pest attraction lighting system which irradiate a field with attraction light for attracting insect pests to keep the insect pests away from plants.

BACKGROUND ART

Conventionally, a plant cultivation/storage apparatus has been known in which, in a space for cultivating plants, a light source which emits light for prompting cultivation of plants is periodically turned on or off, and an attraction light source unit is turned on to emit attraction light for a predetermined time period after the light source is turned off, thereby attracting insect pests to keep the insect pests away from plants (e.g., see Patent Document 1).

However, when attraction-target insect pests are diurnal insect pests, diurnal insect pests are not active while the light source for plant cultivation is turned off, namely, during the dark period of photoperiod. Thus, in the plant cultivation/storage apparatus, even when the attraction light is emitted during the dark period to attempt to keep the insect pests away from plants, the insect pests often stay at or around the plants, and it is difficult to obtain a sufficient effect of protection against diurnal insect pests.

Accordingly, an insect pest-controlling method has been known in which, during the dark period, activity suppression light which suppresses the activity of nocturnal insect pests but increases the activity of diurnal insect pests is emitted, and attraction light is used to attract the activity-increased diurnal insect pests to keep the activity-increased diurnal insect pests away from plants (e.g., see Patent Document 2). In this insect pest-controlling method, the activity suppression light has a wavelength of 500 to 700 [nm], and the attraction light has a wavelength of 300 to 450 [nm].

However, in the above insect pest-controlling method, the activity suppression light includes light having wavelength components of 500 to 600 [nm] which is likely to be reflected by leaves of plants. Thus, even during the dark period, diurnal insect pests can visually recognize the leaves of the plants due to the activity suppression light, and hence damage by the diurnal insect pests may occur.

PRIOR ART DOCUMENTS

Patent Documents

Patent Document 1: Japanese Laid-Open Patent Publication No. 2004-81100
Patent Document 2: Japanese Laid-Open Patent Publication No. 2005-151868

DISCLOSURE OF THE INVENTION

Problems to be Solved by the Invention

The present invention has been made to solve the conventional problems described above, and it is an object of the present invention to provide an insect pest attraction lighting method and an insect pest attraction lighting system which allow an effect of protection against diurnal insect pests to be improved.

Means to Solve the Problems

In order to attain the object described above, the present invention provides an insect pest attraction lighting method for irradiating a field with attraction light for attracting insect pests to keep the insect pests away from a plant, the insect pest attraction lighting method comprising:

a setting step of setting, as an operating time zone, an arbitrary time zone within a time zone during which the field is not exposed to natural light; and a light irradiation step of irradiating an entirety of the field with artificial sunlight which does not include wavelength components of 500 to 600 nm, in the operating time zone set by the setting step, and irradiating a portion of the field with the attraction light in the operating time zone set by the setting step while causing the attraction light to have a peak in a wavelength range of 280 to 700 nm.

Preferably, the attraction light has a peak wavelength in a wavelength range of 500 to 600 nm.

Preferably, a radiation energy sum of the attraction light in a wavelength range of 500 to 600 nm is greater than a radiation energy sum thereof in another wavelength range.

Preferably, the attraction light has a peak wavelength in a wavelength range of 280 to 380 nm.

Preferably, a radiation energy sum of the attraction light in a wavelength range of 280 to 380 nm is greater than a radiation energy sum thereof in another wavelength range.

Preferably, the artificial sunlight has a peak wavelength in a wavelength range of 400 to 500 nm.

Preferably, a radiation energy sum of the artificial sunlight in a wavelength range of 400 to 500 nm is greater than a radiation energy sum thereof in another wavelength range.

Preferably, the setting sep sets, as an operating time zone, an entirety of the time zone during which the field is not exposed to natural light.

Preferably, the setting sep sets, as an operating time zone, an arbitrary time zone which ends at a sunrise time, within the time zone during which the field is not exposed to natural light.

Preferably, the setting sep sets, as an operating time zone, an arbitrary time zone which starts at a sunset time, within the time zone during which the field is not exposed to natural light.

The present invention provides an insect pest attraction lighting system which is installed in a field and emits attraction light for attracting insect pests to keep the insect pests away from a plant, the insect pest attraction lighting system comprising:

a setting unit which sets, as an operating time zone, an arbitrary time zone within a time zone during which the field is not exposed to natural light;

an artificial sunlight source unit which irradiates an entirety of the field with artificial sunlight which does not include wavelength components of 500 to 600 nm, in the operating time zone set by the setting unit; and an attraction light source unit which irradiates a portion of the field with the attraction light in the operating time zone set by the setting unit while causing the attraction light to have a peak in a wavelength range of 280 to 700 nm.

Preferably, the attraction light has a peak wavelength in a wavelength range of 500 to 600 nm.

Preferably, a radiation energy sum of the attraction light in a wavelength range of 500 to 600 nm is greater than a radiation energy sum thereof in another wavelength range.

Preferably, the attraction light has a peak wavelength in a wavelength range of 280 to 380 nm.

Preferably, a radiation energy sum of the attraction light in a wavelength range of 280 to 380 nm is greater than a radiation energy sum thereof in another wavelength range.

Preferably, the artificial sunlight has a peak wavelength in a wavelength range of 400 to 500 nm.

Preferably, a radiation energy sum of the artificial sunlight in a wavelength range of 400 to 500 nm is greater than a radiation energy sum thereof in another wavelength range.

Preferably, the setting unit sets, as an operating time zone, an entirety of the time zone during which the field is not exposed to natural light.

Preferably, the setting unit sets, as an operating time zone, an arbitrary time zone which ends at a sunrise time, within the time zone during which the field is not exposed to natural light.

Preferably, the setting unit sets, as an operating time zone, an arbitrary time zone which starts at a sunset time, within the time zone during which the field is not exposed to natural light.

Effect of the Invention

According to the present invention, the irradiation of the artificial sunlight increases the activity of diurnal insect pests, and the attraction light attracts the activity-increased diurnal insect pests, whereby the activity-increased diurnal insect pests can be kept away from plants. In addition, since the artificial sunlight does not include the light in the wavelength range of 500 to 600 nm which is reflected by the plants, it is made difficult for the diurnal insect pests to visually recognize the plants, and an effect of protection against insects is enhanced further. Moreover, since the attraction light has a peak in the wavelength range of 280 to 700 nm in which the diurnal insect pests have sensitivity, the diurnal insect pests can assuredly be caused to sense the attraction light and can assuredly be attracted by the attraction light.

BRIEF DESCRIPTION OF THE DRAWINGS

[FIG. 1]

FIG. 2 is a perspective view of an artificial sunlight source unit of the system.

FIG. 3 is a diagram showing the spectral transmittance of a cover of the artificial sunlight source unit.

[FIG. 4]

FIG. 5 is a diagram showing the spectral relative sensitivity of diurnal insect pests and the spectral reflectances of leaves of plants.

FIG. 6 is a flowchart of an insect pest attraction lighting process by a setting unit of the system.

[FIG. 7]

FIG. 8 is a perspective view showing the configuration of an insect pest attraction lighting system according to a first modification of the embodiment.

[FIG. 9]

FIG. 10 is a flowchart of an insect pest attraction lighting process in a second modification of the embodiment.

[FIG. 11] FIG. 11A is a time chart of the process and FIG. 11B is a diagram showing an insect trapping efficiency during the process.

[FIG. 12] FIG. 12 is a plan view showing an experiment environment for measuring insect trapping performance during the process.

FIG. 13 is a diagram showing a result of the experiment.

FIG. 14 is a flowchart of an insect pest attraction lighting process in a third modification of the embodiment.

[FIG. 15]

FIG. 16 is a flowchart of an insect pest attraction lighting process in a fourth modification of the embodiment.

[FIG. 17] FIG. 17A is a time chart of the process, FIG. 17B is a diagram showing change in activity rhythm of insect pests which is caused by the process, and FIG. 17C is a diagram showing an insect trapping efficiency during the process.

DESCRIPTION OF THE PREFERRED EMBODIMENTS

Figure 1A:
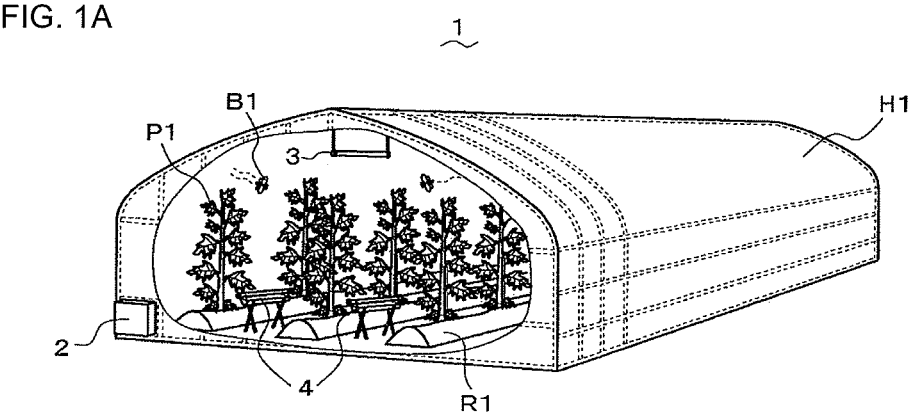
FIG. 1A is a perspective view showing the configuration of an insect pest attraction lighting system according to an embodiment of the present invention and FIG. 1B is an electrical block diagram of the system.
Figure 1B:
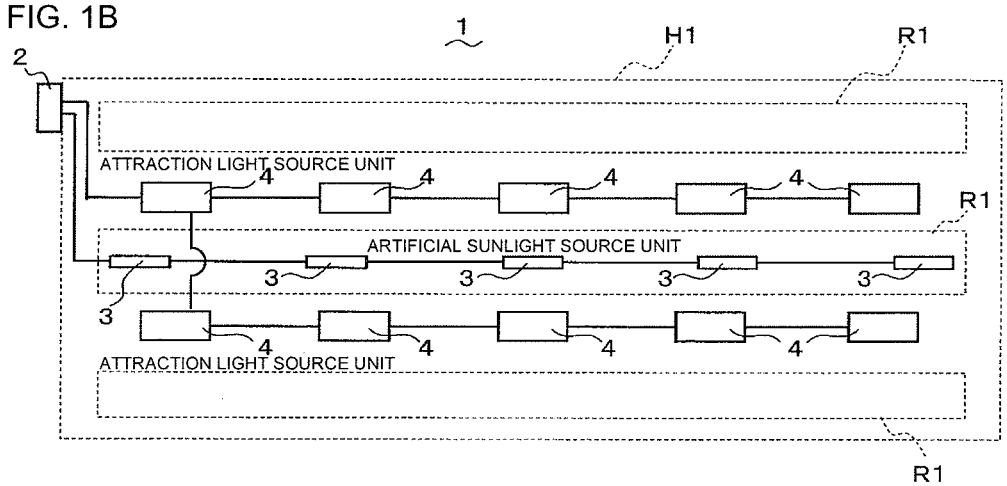

Hereinafter, an insect pest attraction lighting method and an insect pest attraction lighting system according to an embodiment of the present invention will be described with reference to the drawings. FIGS. 1A and 1B show the configuration of the insect pest attraction lighting system (hereinafter, referred to as lighting system) according to the present embodiment. The lighting system 1 is a lighting system which is installed in a plastic greenhouse H1 (field) and emits attraction light for attracting diurnal insect pests (hereinafter, referred to as insect pests) B1 to keep the insect pests B1 away from plants P1.

The lighting system 1 includes a setting unit 2 which sets, as an operating time zone, an arbitrary time zone within a time zone during which an interior of the plastic greenhouse H1 is not exposed to natural light, and artificial sunlight source units 3 and attraction light source units 4 which emit light in the operating time zone that is set by the setting unit 2. The artificial sunlight source units 3 irradiate the entirety of the interior of the plastic greenhouse H1 with artificial sunlight in the operating time zone that is set by the setting unit 2, and the attraction light source units 4 irradiate a portion of the interior of the plastic greenhouse H1 with the attraction light in the operating time zone that is set by the setting unit 2. The artificial sunlight emitted from the artificial sunlight source units 3 does not include wavelength components of 500 to 600 [nm], and the attraction light emitted from the attraction light source units 4 has a peak in a wavelength range of 280 to 700 [nm]. The artificial sunlight suffices not to include light components for which the reflectance of leaves of the plants P1 is equal to or higher than a predetermined value, and the wavelength range of the components that are not included is not limited to 500 to 600 [nm]. The attraction light source units 4 trap the attracted insect pests B1. In the present embodiment, the time zone during which there is no exposure to natural light is regarded as a nighttime zone from sunset to sunrise, and may include a time zone at dusk before sunset and a time zone at twilight after sunset, during each of which the amount of natural light is equal to or lower than a predetermined value in the case of a clear sky.

The setting unit 2 includes an electric switchboard which distributes and supplies power from a commercial power source to the artificial sunlight source units 3 and the attraction light source units 4, and a time switch which sets a time to start power supply by the electric switchboard and a time to stop the power supply and automatically executes the power supply or stop of the power supply at the set time. The time switch turns on the artificial sunlight source units 3 and the attraction light source units 4 by the power supply, and turns off these units by the stop of the power supply. Thus, the power supply start time and the power supply stop time correspond to an operation start time and an operation end time, respectively, of the artificial sunlight source units 3 and the attraction light source units 4. The time switch can be configured as a solar time switch which turns on or off in accordance with a previously stored sunrise or sunset time. The solar time switch may set, as an operating time zone, an arbitrary time zone which starts at the sunset time, within the time zone during which the interior of the plastic greenhouse H1 is not exposed to natural light, or may set, as an operating time zone, an arbitrary time zone which ends at the sunrise time, within the time zone during which the interior of the plastic greenhouse H1 is not exposed to natural light. According to the above settings, the solar time switch may cause the electric switchboard to start a power supply operation at the sunset time and to stop the power supply operation at a time after elapse of a predetermined time period from the sunset time, or may cause the electric switchboard to start the power supply operation at a time which is prior to the sunrise time by a predetermined time period and to stop the power supply operation at the sunrise time. A power supply period (an operating period of the artificial sunlight source units 3 and the attraction light source units 4) may previously be set at a stage of manufacturing or may arbitrarily be settable by a user, and is desirably substantially 2 to 3 hours. Sunrise or sunset time information may previously be inputted and stored at manufacturing, or may be able to be inputted by a user with an operation unit provided to the solar time switch. The amount of sunrise or sunset time information which can be inputted may be an amount for one day, one week, one month, or one year.

The solar time switch may previously store the calendars of various areas. When current date and time and an area in which the apparatus is installed are inputted with the operation unit, the solar time switch may refer to the calendar of the inputted installation area, may recognize the sunset time of the current date and the sunrise time of the next day, and may control power supply in accordance with the sunset time and the sunrise time. The solar time switch desirably includes a display unit which can display the above various inputted contents.

The artificial sunlight source units 3 are used for general illumination, and the installation number and the arrangement thereof and the amount of emitted light and the irradiation range of each artificial sunlight source unit 3 are set such that the artificial sunlight extends to the entirety of the interior of the plastic greenhouse H1. For example, the artificial sunlight source units 3 are hung down from frames at a ceiling within the plastic greenhouse H1 and located near the ceiling, are arranged parallel to ridges R1, and are provided in a single or a plurality of lines as appropriate. The artificial sunlight source units 3 irradiate the plants P1 with the artificial sunlight from above. The amount of emitted light of each artificial sunlight source unit 3 is, for example, equal to or less than 100 [lx] but is not limited thereto.

The attraction light source units 4 are used for local illumination and are located within the plastic greenhouse H1 so as to be spaced apart from each other. The attraction light source units 4 are installed, for example, on soil within the plastic greenhouse H1 and along the ridges R1, and are provided in a single or a plurality of lines as appropriate. The attraction light source units 4 emit the attraction light from near the soil or positions lateral to the plants P1, to the upper side or lateral side of the plants P1. The amount of emitted light of each attraction light source unit 4 is, for example, equal to or less than 100 [lx] but is not limited thereto. The numbers and the arrangements of the artificial sunlight source units 3 and the attraction light source units 4 are not limited to those shown.

Figure 2:
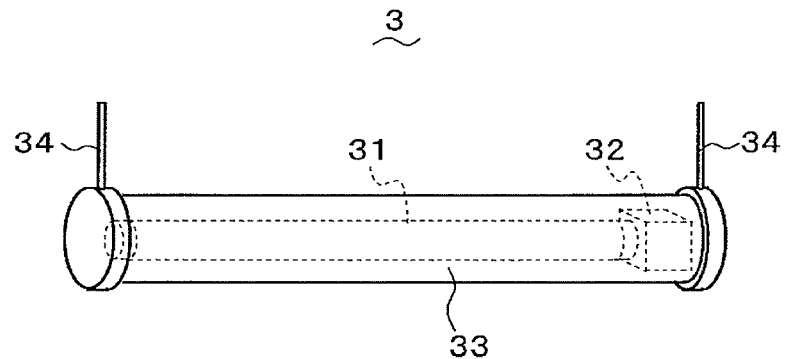
[FIG. 2]

FIG. 2 shows the configuration of the artificial sunlight source unit 3. The artificial sunlight source unit 3 includes a straight-tube discharge lamp 31, a stabilizer 32 for stabilizing discharge of the discharge lamp 31, a cylindrical cover 33 which accommodates the discharge lamp 31 and the stabilizer 32, and hanging members 34 for hanging the cover 33. The discharge lamp 31 is configured as a white fluorescent lamp, an HID lamp, or the like, and the cover 33 is configured as a translucent member having an optical filter function. The configuration of the artificial sunlight source unit 3 is not limited to the above.

Figure 3:
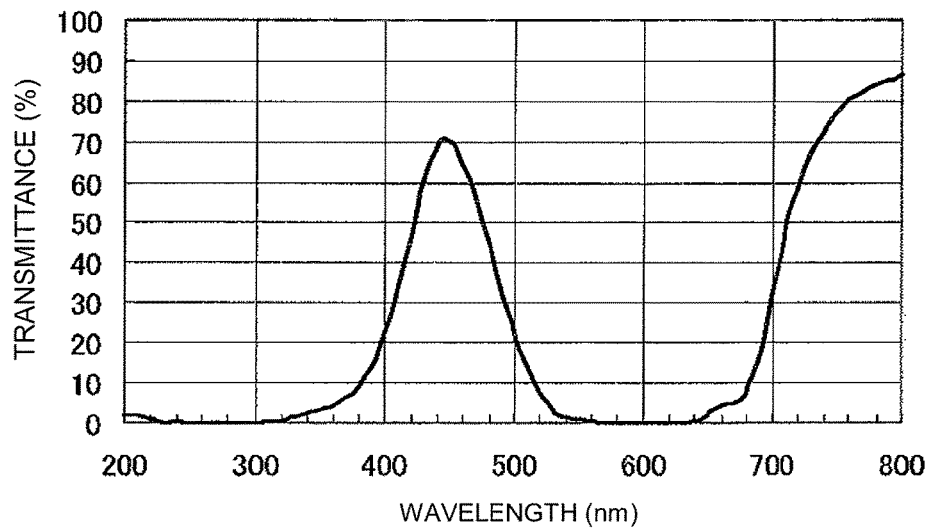
[FIG. 3]

FIG. 3 shows the spectral transmittance of the cover 33. Here, the maximum value of the spectral transmittance of the cover 33 is set to 100 [%]. The transmittance of the cover 33 is averagely less than 5 [%] with respect to light having a wavelength of 500 to 600 [nm], and becomes 0 [%] when being rounded off. In addition, the transmittance has a peak in a wavelength range of 400 to 500 [nm]. Thus, light transmitted through the cover 33, namely, the artificial sunlight, includes almost no wavelength components of 500 to 600 [nm], and has a peak wavelength in the wavelength range of 400 to 500 [nm]. In the artificial sunlight, when the maximum energy in all wavelength components is set to 100 [%], the average energy of the wavelength components of 500 to 600 [nm] is less than 5 [%], and becomes 0 [%] by being rounded off. The cover 33 is formed by blending a pigment or a dye such as phthalocyanine blue, magenta, or mineral violet into a base such as glass, acrylic resin, or polycarbonate, in order to have the above spectral transmission characteristic. The spectral transmittance of the cover 33 is not limited to the shown characteristic.

Figure 4A:
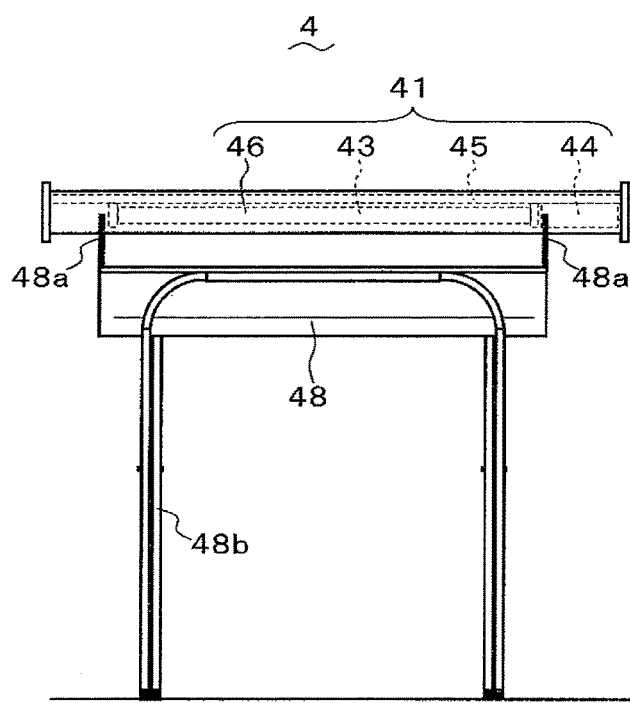
FIG. 4A is a front view of an attraction light source unit of the system and FIG. 4B is a side view of the attraction light source unit.
Figure 4B:
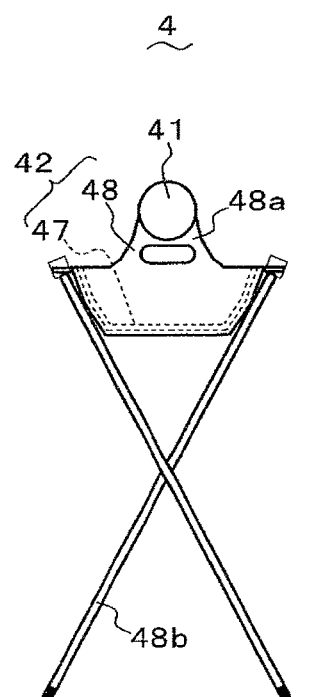

FIGS. 4A and 4B show the configuration of the attraction light source unit 4. The attraction light source unit 4 includes a light source unit 41 of the attraction light and a trap 42 which traps the insect pests B1 attracted by the attraction light.

The light source unit 41 includes a straight-tube discharge lamp 43, a stabilizer 44 for stabilizing discharge of the discharge lamp 43, and a support member 45 which supports the discharge lamp 43 and the stabilizer 44, and a cylindrical cover 46 which accommodates the discharge lamp 43, the stabilizer 44, and the support member 45 and has translucency.

The spectral characteristic of the discharge lamp 43 is adjusted such that emitted light thereof has a peak wavelength in the wavelength range of 500 to 600 [nm] or a radiation energy sum of the emitted light in the wavelength range of 500 to 600 [nm] is greater than radiation energy sums thereof in any other wavelength ranges. The discharge lamp 43 can be configured as a yellow fluorescent lamp or a sodium lamp. Instead of the discharge lamp 43, a yellow LED unit may be provided.

The cover 46 may have an optical filter function. In this case, the above spectral characteristic of the discharge lamp 43 can be achieved by a combination of the discharge lamp 43 and the cover 46, the cover 46 can be composed of a yellow color filter, and the discharge lamp 43 can be configured as a white fluorescent lamp or a white HID lamp.

The trap 42 includes an adhesive sheet 47 for insect trapping, a gutter-like member 48 which is opened at an upper side thereof and in which the pressure sensitive adhesive sheet 47 is provided. The pressure sensitive adhesive sheet 47 is located near a light emitting surface of the cover 46. The color of the pressure sensitive adhesive sheet 47 is desirably the same as the color of the attraction light. The gutter-like member 48 supports the cover 46 via a support member 48a extending upward from the gutter-like member 48, to locate the cover 46 above the gutter-like member 48. In addition, legs 48b are mounted to the gutter-like member 48. The configuration of the attraction light source unit 4 is not limited to the above.

Figure 5:
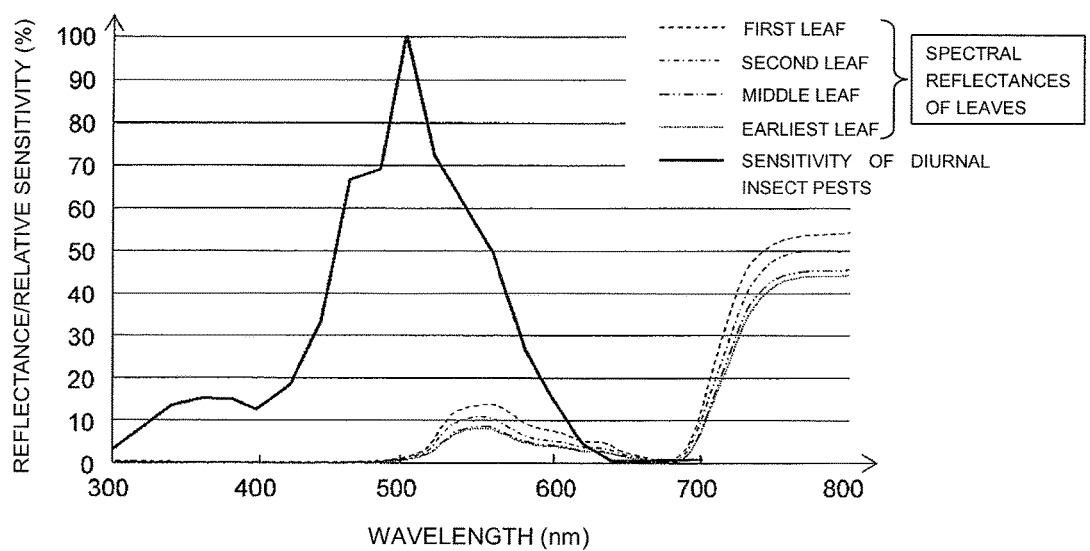
[FIG. 5]

FIG. 5 shows the spectral relative sensitivity of the insect pests B1 and the spectral reflectances of the leaves of the plants P1. The insect pests B1 have sufficient sensitivity with respect to light in wavelength ranges other than 600 to 700 [nm], and can be sufficiently sensitive to the artificial sunlight from the artificial sunlight source units 3. In addition, the leaves of the plants P1 have a reflectance of 0 with respect to light of a wavelength of 500 [nm] or lower and light of a wavelength of 600 [nm] or higher, and have a reflectance of substantially 10 [%] with respect to light in the wavelength range of 500 to 600 [nm].

Figure 6:
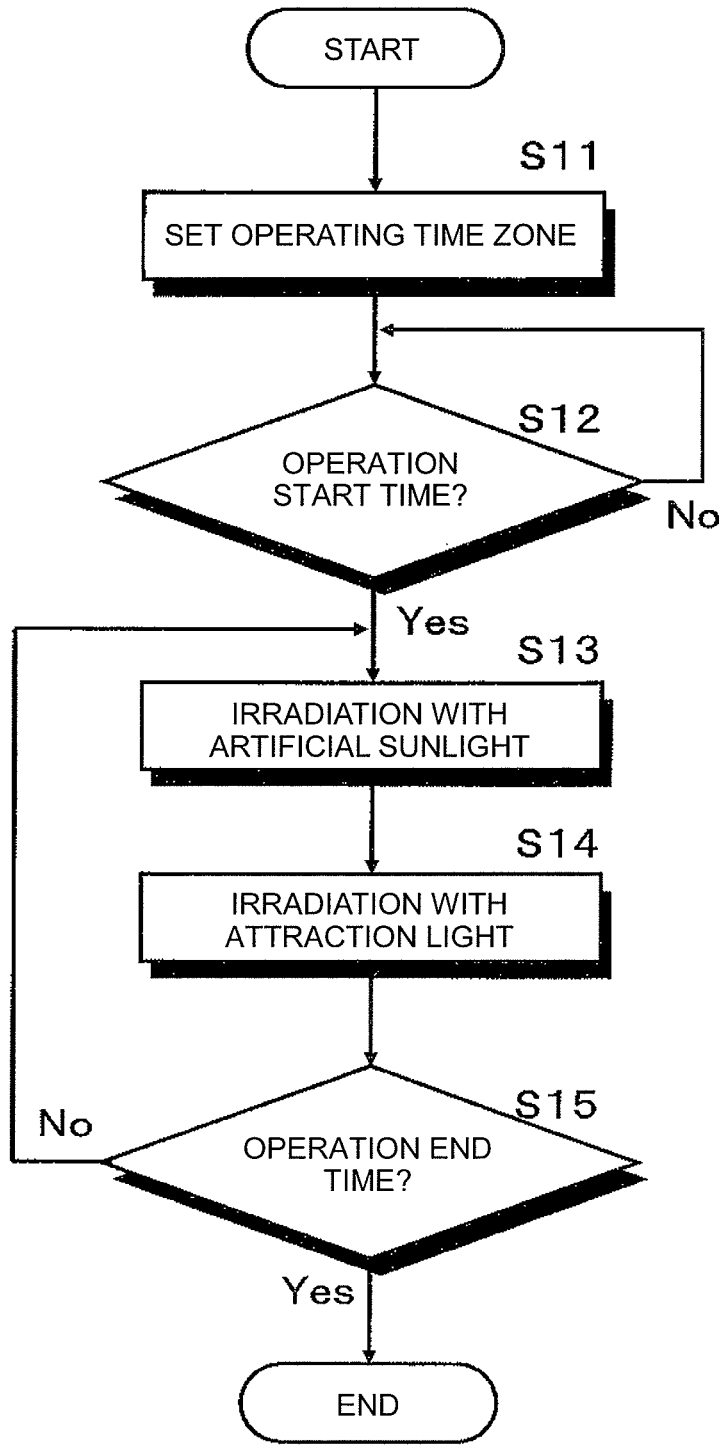
[FIG. 6]
Figure 7A:
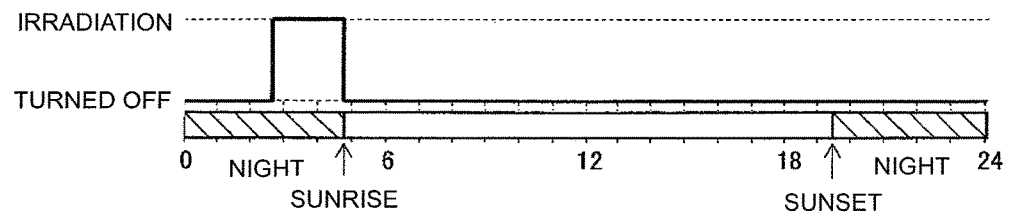
FIG. 7A is a time chart showing a specific example of the insect pest attraction lighting process in a long day period and FIG. 7B is a time chart showing a specific example of the insect pest attraction lighting process in a short day period.
Figure 7B:
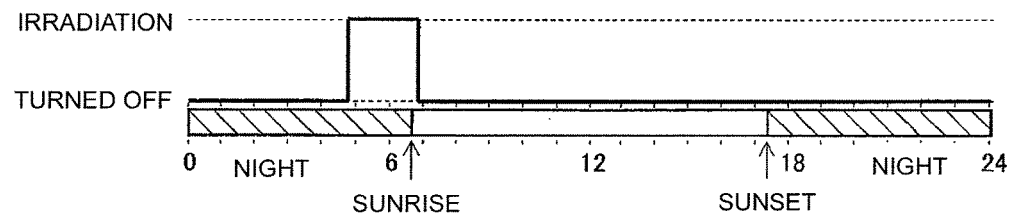

FIG. 6 shows the procedure of an insect pest attraction lighting process (hereinafter, referred to as lighting process) by the setting unit 2, and FIGS. 7A and 7B show a specific example of time charts of the lighting process in a long day period and a short day period. First, at manufacturing or on the basis of an operation from a user, an operating time zone is set (S11). When the current time reaches an operation start time (Yes at S12), the artificial sunlight source units 3 are turned on to irradiate the entirety of the interior of the plastic greenhouse H1 with the artificial sunlight (S13), and the attraction light source units 4 are turned on to locally irradiate the interior of the plastic greenhouse H1 with the attraction light (S14). For example, the operation start time is set to a time which is prior to a sunrise time by a predetermined time period, for example, by substantially 2 hours (see FIG. 7), but may be set to a sunset time. Although the attraction light is applied to the leaves of the plants P1, the reflectances of the leaves thereto are substantially 10 [%] and hence the brightness of the attraction light source units 4 is much higher than that of the leaves. Therefore, more of the insect pests B1 are attracted to the attraction light source units 4 having higher brightness. The order of the processes at S13 and S14 may be inverted. The process is in a standby state while the current time has not reached the operation start time (No at S12).

Until the current time reaches an operation end time (No at S15), the irradiation of the artificial sunlight and the attraction light is continued. The operation end time is set to the sunrise time when the operation start time is the time which is prior to the sunrise time by the predetermined time period (see FIG. 7), and is set to a time which is after elapse of a predetermined time period from the sunset time when the operation start time is the sunset time. When the current time reaches the operation end time (Yes at S15), the process ends. The process described above is repeated daily. As shown in FIG. 7, when the operating time zone is prior to sunrise, the operating time zone is earlier in the long day period than in the short day period.

In the present embodiment, the irradiation of the artificial sunlight during nighttime causes the insect pests B1 to be under an illusion that even during nighttime, it is the morning, daytime, or evening, to increase the activity of the insects pests B1. The attraction light attracts the activity-increased insect pests B1, whereby the activity-increased insect pests B1 can be kept away from the plants P1. Thus, protection against the insect pests B1 can positively be provided during nighttime, and therefore, an effect of protection against insects can be improved. In addition, since the artificial sunlight does not include the light in the wavelength range of 500 to 600 [nm] which is reflected by the plants P1, it is made difficult for the insect pests B1 to visually recognize the plants P1, and therefore, the insect pests B1 less frequently stay at the plants P1. As a result, the effect of protection against insects is enhanced further. Moreover, since the attraction light has a peak in a wavelength range of 280 to 700 [nm] in which the insect pests B1 have sensitivity, the insect pests B1 can assuredly be caused to sense the attraction light, and therefore, can assuredly be attracted by the attraction light.

Further, the attraction light includes the light in the wavelength range which is not included in the artificial sunlight, and the light in the wavelength range is reflected by the plants P1, but the irradiation range of the artificial sunlight is the entirety of the interior of the plastic greenhouse H1 and the irradiation range of the attraction light is the portion of the interior of the plastic greenhouse H1. Thus, even when the insect pests B1 can visually recognize the plants P1 due to the attraction light, the number of the recognized plants P1 is decreased. Therefore, damage by the insect pests B1 can be suppressed.

Further, as the attraction light, the light in the wavelength range of 500 to 600 [nm], namely, light whose color is the same as or similar to that of the leaves of the plants P1, is emitted so as to be more intense than light of the other wavelengths. Thus, the insect pests B1 mistake the attraction light source units 4 for leaves. Due to this, the effect of attraction to the attraction light is enhanced, and therefore, the effect of protection against insects is enhanced.

Further, as the artificial sunlight, the light in the wavelength range of 400 to 500 [nm], namely, light in a wavelength range in which the sensitivity of the insect pests B1 is increased, is emitted during nighttime so as to be more intense than light of the other wavelengths. Thus, the activity of more of the insect pests B1 is increased during nighttime. Therefore, the number of the insect pests B1 that are attracted by the attraction light to move away from the plants P1 can be increased, and hence the effect of protection against the insect pests B1 is enhanced further.

Further, general illumination in an ultraviolet range in which the attraction effect on the insect pests B1 is increased can be reduced, and thus entry of the insect pests B1 from the outside of the plastic greenhouse H1 can be suppressed.

Further, when the operating time zone of the artificial sunlight source units 3 and the attraction light source units 4 is set to a time zone which ends at the sunrise time, a controlling effect on the insect pests B1 that start to be highly active after sunrise is enhanced. This is because a time difference between a highly active time zone of such insect pests B1 and the irradiation time zone of the artificial sunlight is small as compared to that for the insect pests B1 that are active during another time zone. Therefore, it is easy to cause the artificial sunlight to be mistaken for natural light.

Further, when the operating time zone of the artificial sunlight source units 3 and the attraction light source units 4 is set to a time zone which starts at the sunset time, the controlling effect on the insect pests B1 that start to be highly active in evening is enhanced. The reason is the same as the above.

Next, lighting systems according to various modifications of the embodiment described above will be described.

(First Modification)

Figure 8:
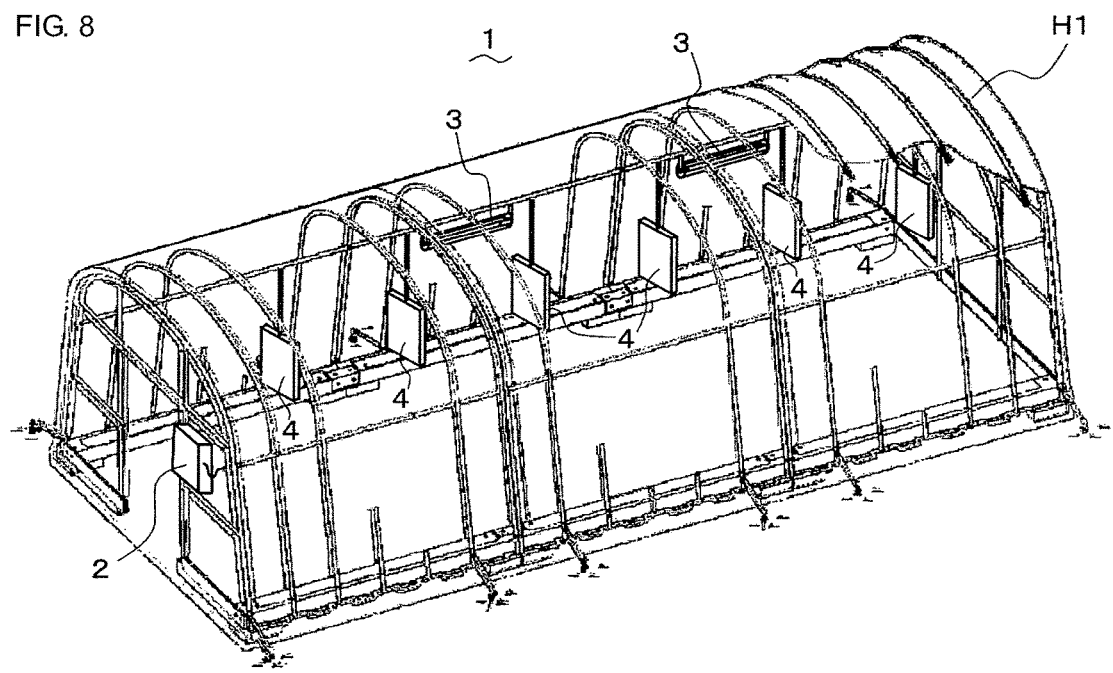
[FIG. 8]

FIG. 8 shows the configuration of a lighting system 1 according to a first modification. In the present modification, attraction light source units are hung down from the frames at the ceiling of the plastic greenhouse H1. In the present modification as well, the attraction light source units 4 are used for local illumination.

Figure 9A:
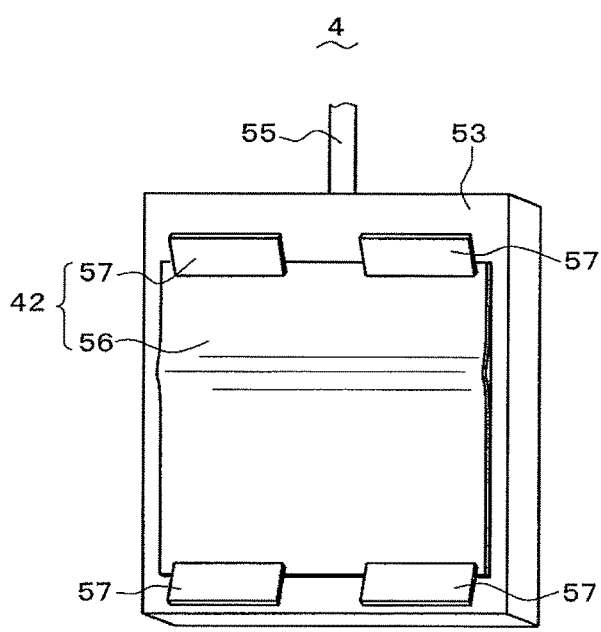
FIG. 9A is a perspective view of an attraction light source unit of the system and FIG. 9B is a cross-sectional view of the attraction light source unit.
Figure 9B:
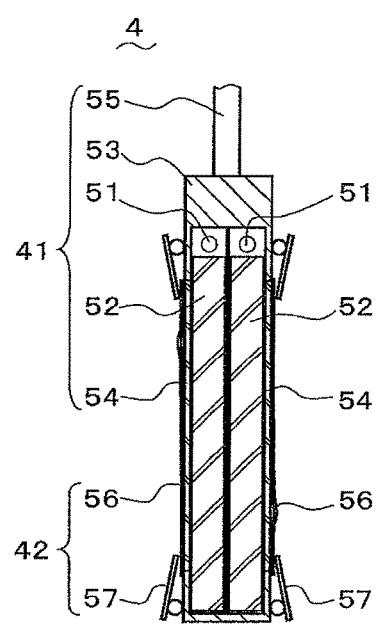

FIGS. 9A and 9B show the configuration of the attraction light source unit 4 in the present modification. The light source unit 41 of the attraction light source unit 4 includes cold cathode lamps 51, light guide plates 52 which guide light emitted from the cold cathode lamps 51, a case 53 which accommodates the cold cathode lamps 51 and the light guide plates 52 and is opened at front and back sides thereof, plate-like optical filters 54 which close the openings of the case 53, and a hanging member 55 for hanging the case 53. The trap 42 of the attraction light source unit 4 includes transparent pressure sensitive adhesive sheets 56 for insect trapping which are located so as to cover the front surfaces of the optical filters 54, and clips 57 each of which is mounted to the case 53 and sandwiches the transparent pressure sensitive adhesive sheet 56 together with the optical filter 54 or the case 53 to fix the transparent pressure sensitive adhesive sheet 56. The light guide plates 52 are located so as to close the openings of the case 53 from the inside. A pair of the cold cathode lamp 51 and the light guide plate 52 is provided for each of the front opening and the back opening of the case 53. The number of these pairs is not limited to the above.

The spectral transmittance of each optical filter 54 is adjusted such that transmitted light has a peak wavelength in the wavelength range of 500 to 600 [nm] or a radiation energy sum of the transmitted light in the wavelength range of 500 to 600 [nm] is greater than radiation energy sums thereof in any other wavelength ranges. In the present modification as well, the same effects as those in the embodiment described above can be obtained.

(Second Modification)

The configuration of a lighting system according to a second modification is the same as the configuration of the embodiment shown in FIG. 1, and will be described with reference to FIG. 1 (the same applies to modifications described below). The lighting system 1 according to the present modification differs from that of the embodiment described above, in the operating time zone of the artificial sunlight source units 3 and the attraction light source units 4 which is set by the setting unit 2. The setting unit 2 sets, as an operating time zone, the entirety of the time zone during which the interior of the plastic greenhouse H1 is not exposed to natural light.

Figure 10:
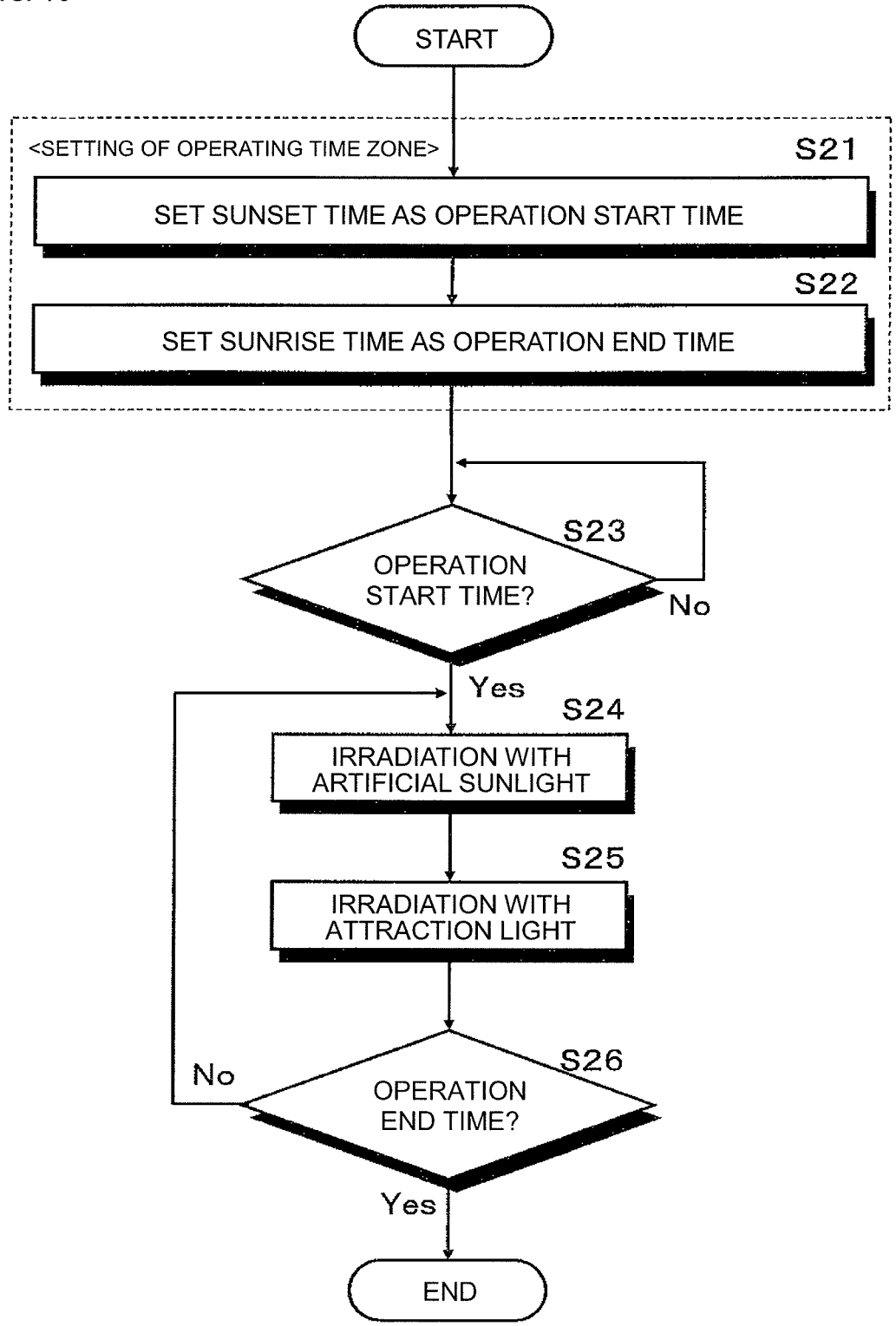
[FIG. 10]

FIG. 10 shows the procedure of a lighting process by the setting unit 2 in the present modification. In an operating time zone setting process in the lighting process, the setting unit 2 sets a sunset time as an operation start time (S21) and sets a sunrise time as an operation end time (S22). Subsequently executed processes at S23 to S26 are the same as the processes at S12 to S15, respectively, in the lighting process in the embodiment described above which are shown in FIG. 6.

FIGS. 11A and 11B show a time chart of the lighting process and temporal change in insect trapping efficiency which is caused by execution of the lighting process. Here, an insect trapping efficiency indicates the ratio of the number of the insect pests B1 trapped by the pressure sensitive adhesive sheets 47, to the number of the insect pests B1 that gather at the plants P1. As shown in FIG. 11A, the artificial sunlight source units 3 and the attraction light source units 4 are turned on at the sunset time, continued to be lit up during nighttime, and are turned off at the sunrise time.

As shown in FIG. 11B, the insect trapping efficiency is increased during nighttime during which the artificial sunlight source units 3 and the attraction light source units 4 are in operation, and in addition, maintains an increased value throughout nighttime. This is because if the attraction light is emitted during daytime, the attraction light gets mixed in natural light whose amount is increased, but the artificial sunlight and the attraction light are effective during nighttime since the amount of natural light is decreased during nighttime. Thus, an effect of increasing the activity of the insect pests B1 by the artificial sunlight and keeping the activity-increased insect pests B1 away from the plants P1 by the attraction light is enhanced, and therefore, the insect trapping efficiency increases. Moreover, the irradiation of the artificial sunlight and the attraction light which increase the insect trapping efficiency is continued throughout nighttime, and thus the increased insect trapping efficiency is maintained.

During daytime, the artificial sunlight source units 3 and the attraction light source units 4 are not in operation, but the insect pests B1 are active and can be trapped by the pressure sensitive adhesive sheets 47 of the attraction light source units 4. Thus, although the insect trapping efficiency is lower than that during nighttime which the artificial sunlight source units 3 and the attraction light source units 4 operate, the insect pests B1 are trapped.

FIG. 12 shows an experiment environment for measuring insect trapping performance by the lighting process. The experiment was conducted in a test area 62 obtained by dividing an interior of a glass house (hereinafter, referred to as house) 6 by a shading screen 61. In the present experiment, tobacco whiteflies (hereinafter, referred to as whiteflies) were used as test insect pests, the whiteflies were caused to parasitize cucumbers, and a planter 63 in which the cucumbers were planted was put as a source of whiteflies near the center of the test area 62.

Further, the artificial sunlight source unit 3 was installed directly above the source and at a position distant from the source by 40 [cm], and was lit up throughout nighttime such that the illuminance around the planter 63 by the artificial sunlight source unit 3 was 43.7 [lx]. In addition, the attraction light source unit 4 was installed at a position which is 2 [m] east of the planter 63, and a yellow adhesive plate 64 for insect trapping was installed at a position which is 2 [m] west of the planter 63. The color of the pressure sensitive adhesive sheet 47 (see FIG. 4) of the attraction light source unit 4 was yellow. Moreover, in order to suppress increase in the temperature within the house 6, two fans 65 were installed in the test area 62 so as to send air from the inside of the house 6 to the outside of the house 6, and ventilation was always performed by the fans 65.

After 4 to 5 days, the pressure sensitive adhesive sheet 47 and the yellow adhesive plate 64 were collected, and the numbers of trapped whiteflies were counted. It should be noted that the experiment was conducted under two conditions, namely, under a first condition where the attraction light source unit 4 is lit up from 2 a.m. to a sunrise time between 4 and 5 a.m. for substantially 2 to 3 hours, and under a second condition where the attraction light source unit 4 is lit up throughout nighttime. The experiment under the second condition corresponds to practice of the present modification.

Figure 13:
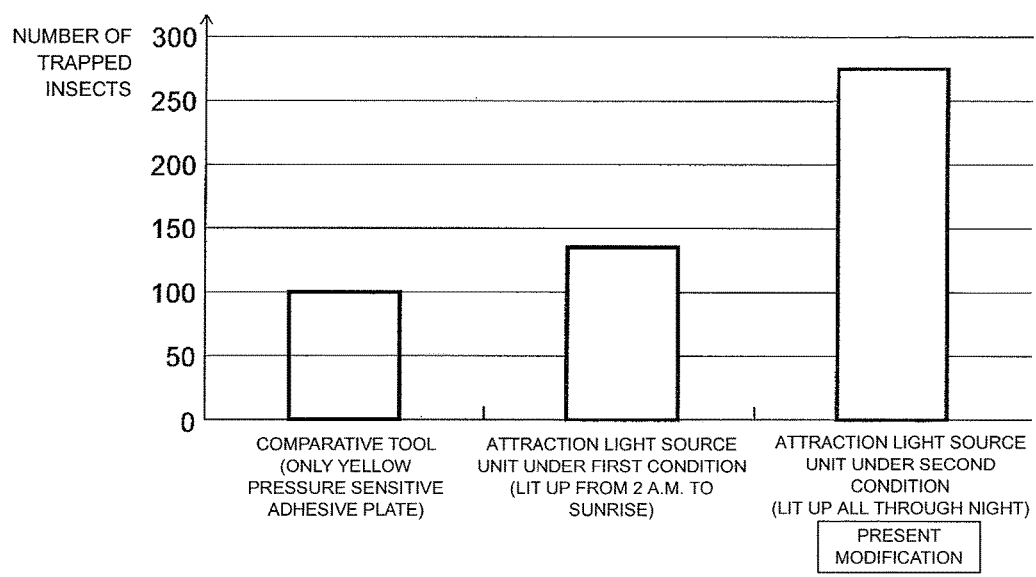
[FIG. 13]

FIG. 13 shows the result of the experiment. As shown in FIG. 13, the number of insects trapped by the pressure sensitive adhesive sheet 47 under the first condition was higher than the number of insects trapped by the yellow adhesive plate 64, and the number of insects trapped by the pressure sensitive adhesive sheet 47 under the second condition (the present modification) was higher than this number of insects trapped and was the highest.

In the present modification, due to the all-night irradiation of the artificial sunlight and the attraction light, a time zone during which the insect pests B1 can be kept away from the plants P1 with increased efficiency, is made the longest, and therefore, a time zone during which the insect trapping efficiency is increased is also made the longest. Thus, the number of insects trapped can be maximized, and the effect of protection against insects can be improved further.

(Third Modification)

A lighting system 1 according to a third modification differs from that of the embodiment described above, in the operating time zone of the artificial sunlight source units 3 and the attraction light source units 4 which is set by the setting unit 2. In the present modification, the operating time zone is a time zone which ends at the sunrise time, within the time zone during which the interior of the plastic greenhouse H1 is not exposed to natural light, and is a time zone which is effective for controlling insect pests that are active in morning (hereinafter, referred to as insect pests B1' in the present specification in order to be differentiated from the insect pests B1 described above). The insect pests B1' are insect pests which start to be active when the ambient brightness increases after sunrise, are highly active for a certain time period that does not extend beyond the morning, for example, for substantially 3 to 4 hours, and then decrease the activity. The setting unit 2 causes the insect pests B1' to mistake the artificial sunlight for sunrise by irradiation of the artificial sunlight before the sunrise, to make the insect pests B1' start to be active earlier than normal. By so doing, a highly active time zone of the insect pests B1' is made earlier than the sunrise. Then, the setting unit 2 causes the artificial sunlight source units 3 and the attraction light source units 4 to continuously emit the artificial sunlight and the attraction light during the active time zone. The setting unit 2 is configured such that the highly active time zone of the insect pests B1' at normal time can be inputted thereto. The highly active time zone is regarded as a time zone during which the activity level of the insect pests B1' is equal to or higher than a predetermined threshold.

Figure 14:
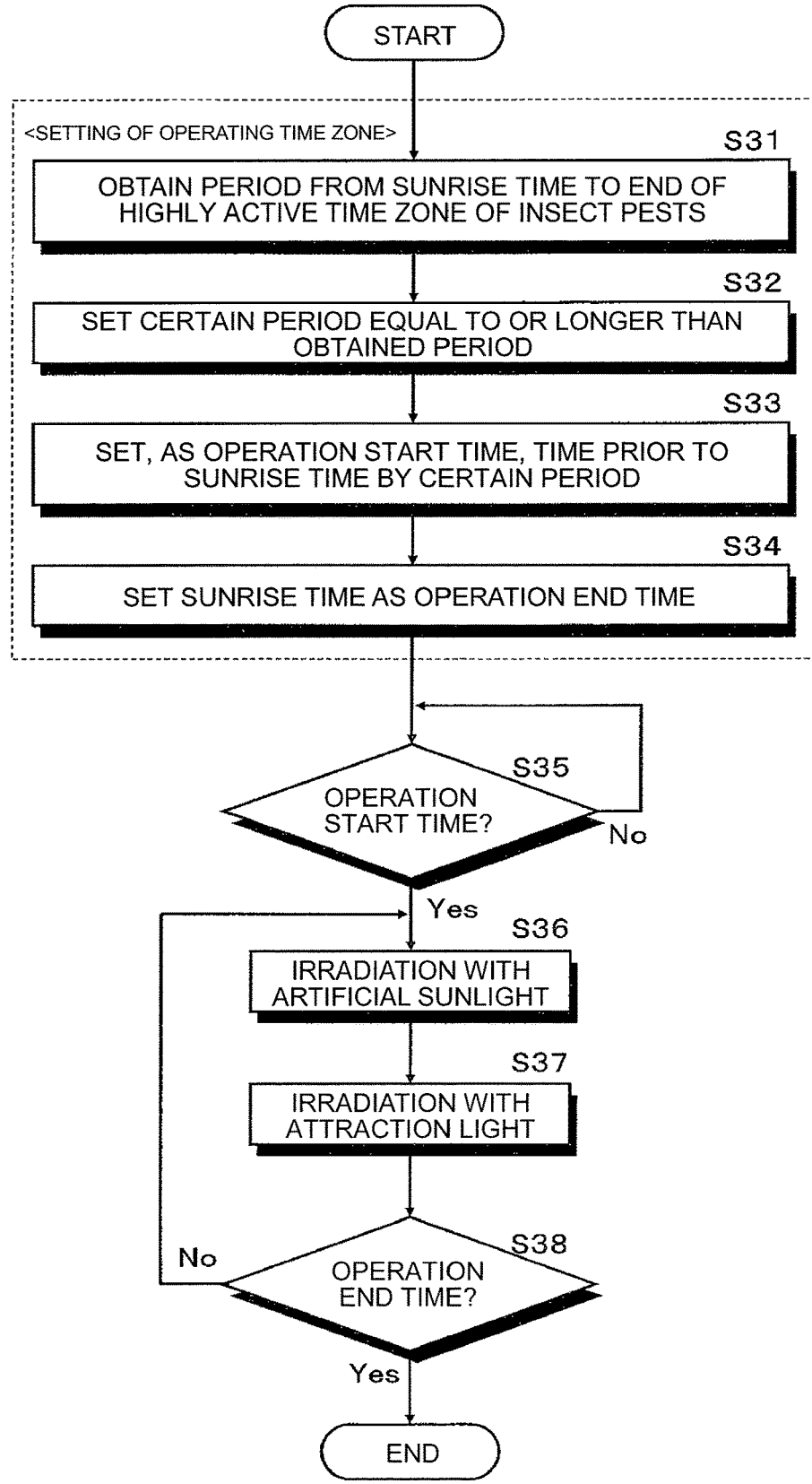
[FIG. 14]

FIG. 14 shows the procedure of a lighting process by the setting unit 2 in the present modification. The setting unit 2 obtains a period from a sunrise time to the end of a time zone during which the insect pests B1' are normally highly active (S31), sets a certain period which is equal to or longer than the obtained period (S32), and sets, as an operation start time, a time which is prior to the sunrise time by substantially the set certain period (S33). An operation end time may be later than the sunrise time by substantially 1 hour. In addition, the setting unit 2 sets the sunrise time as an operation end time (S34). Processes at S35 to S38 executed after the process at S34 are the same as the processes at S12 to S15, respectively, in the lighting process in the embodiment described above which are shown in FIG. 6.

Figure 15A:
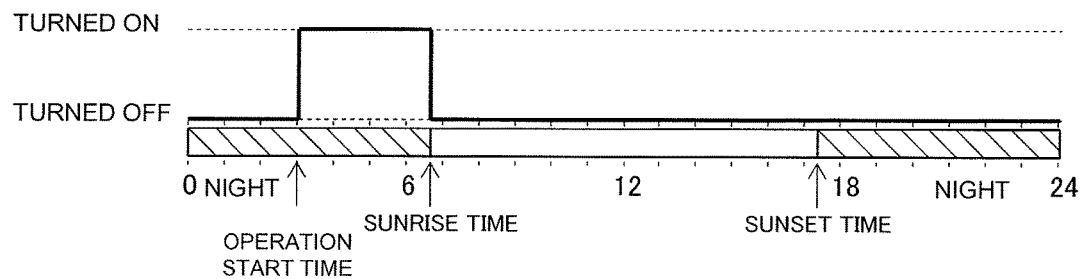
FIG. 15A is a time chart of the process.
Figure 15B:
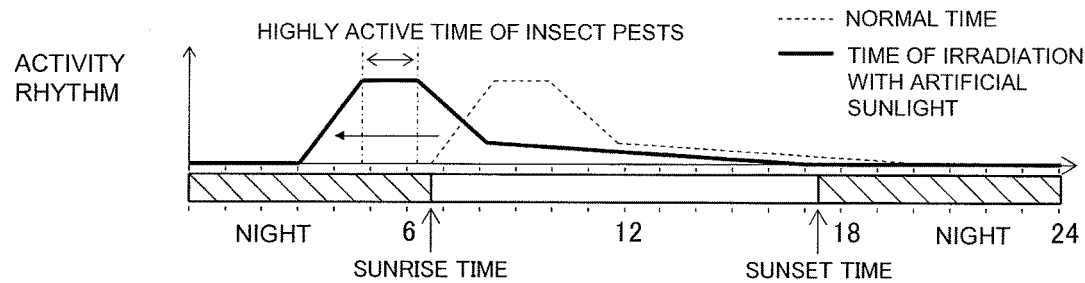
FIG. 15B is a diagram showing change in activity rhythm of insect pests which is caused by the process.
Figure 15C:
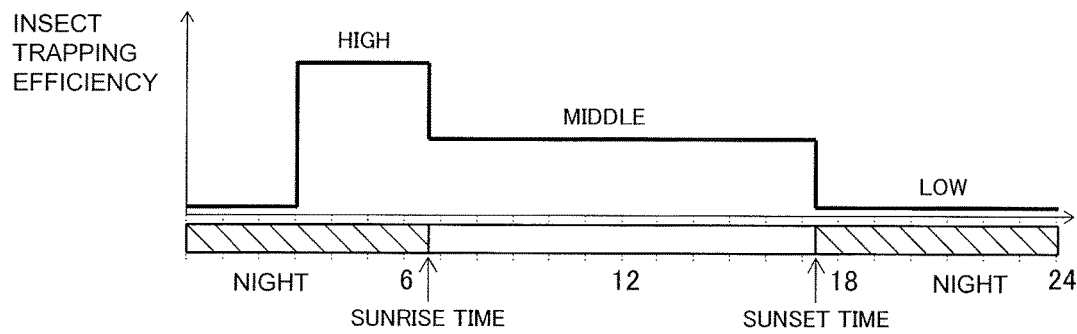
FIG. 15C is a diagram showing an insect trapping efficiency during the process.

FIGS. 15A to 15C show a time chart of the lighting process and change in activity rhythm of the insect pests B1' and temporal change in insect trapping efficiency which are caused by the lighting process. As shown in FIG. 15A, the artificial sunlight source units 3 and the attraction light source units 4 are turned on at the operation start time before sunrise and turned off at the sunrise time.

Here, as shown in FIG. 15B, at normal time (at non-irradiation of the artificial sunlight and the attraction light), the insect pests B1' gradually increase the activity after the sunrise, and maintain the highly active state for a certain period. In addition, after the insect pests B1' maintain the highly active state, the activity level gradually decreases to a certain level, and then gently decreases (the activity rhythm at normal time is indicated by a broken line). When being irradiated with the artificial sunlight before the sunrise according to the lighting process, such insect pests B1' mistake the light irradiation for sunrise, and the active time zone of the insect pests B1' is made earlier, and the activity rhythm of the insect pests B1' are made temporally earlier. Then, the irradiation period of the artificial sunlight and the attraction light overlaps the time zone during which the insect pests B1' are highly active.

Therefore, as shown in FIG. 15C, the insect trapping efficiency becomes the highest in the early morning in which the artificial sunlight source units 3 and the attraction light source units 4 are in operation. The insect trapping efficiency becomes the second highest in the daytime in which the artificial sunlight source units 3 and the attraction light source units 4 are not in operation, and becomes the lowest in the nighttime in which the artificial sunlight source units 3 and the attraction light source units 4 are not in operation.

In the present modification, the irradiation of the artificial sunlight and the attraction light from the predetermined time before the sunrise to the sunrise causes the active time zone of the insect pests B1' to be made earlier than normal. Thus, the irradiation period of the artificial sunlight and the attraction light overlaps the time zone during which the insect pests B1' are highly active, and hence it is possible to trap insects with increased efficiency. Therefore, with power consumption lower than that in the second modification described above, the number of trapped insects which is close to that in the second modification can be obtained.

(Fourth Modification)

A lighting system 1 according to a fourth modification differs from that of the embodiment described above, in the operating time zone of the artificial sunlight source units 3 and the attraction light source units 4 which is set by the setting unit 2. In the present modification, the operating time zone is a time zone which starts at the sunset time, within the time zone during which the interior of the plastic greenhouse H1 is not exposed to natural light, and is a time zone which is effective for controlling insect pests that are active in evening before sunset (hereinafter, referred to as insect pests B1" in the present specification in order to be differentiated from the insect pests B1 and B1' described above). The insect pests B1' are insect pests which rapidly increase the level of the activity when the temperature or the illuminance by natural light decreases from daytime to nighttime to be less than a certain value, and then are highly active, decrease the activity level when the surrounding is darkened due to sunset, and stop the activity. The setting unit 2 causes the insect pests B1" to misunderstand that it is before sunset, by irradiation of the artificial sunlight after the sunset, to extend their active time zone, and causes the artificial sunlight source units 3 and the attraction light source units 4 to at least continuously emit the artificial sunlight and the attraction light until a time of an extension limit. The setting unit 2 is configured such that the extension limit time for a highly active time zone of the insect pests B1" at normal time can be inputted thereto. The highly active time zone is regarded as a time zone during which the activity level of the insect pests B1" is equal to or higher than a predetermined threshold.

Figure 16:
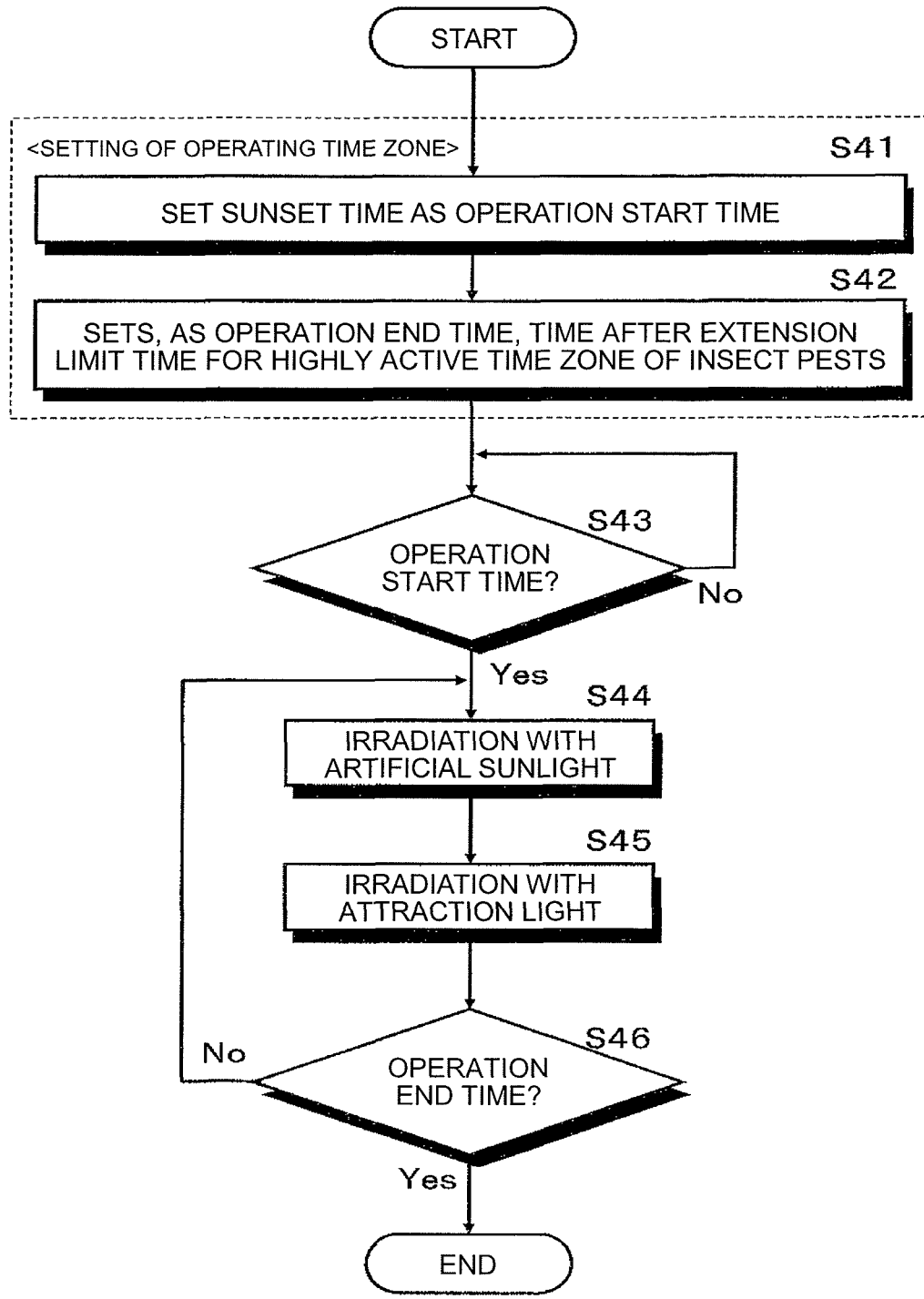
[FIG. 16]

FIG. 16 shows the procedure of a lighting process by the setting unit 2 in the present modification. The setting unit 2 sets a sunset time as an operation start time (S41), and sets, as an operation end time, a time which is after the inputted extension limit time (S42). The operation start time may be earlier than the sunset time by substantially 1 hour. Processes at S43 to S46 executed after the process at S42 are the same as the processes at S12 and S15, respectively, in the lighting process in the embodiment described above which are shown in FIG. 6.

FIGS. 17A to 17C show a time chart of the lighting process and change in activity rhythm of the insect pests B1" and temporal change in insect trapping efficiency which are caused by the lighting process. As shown in FIG. 17A, the artificial sunlight source units 3 and the attraction light source units 4 are turned on at the sunset time and turned off at the operation end time after sunset.

Here, as shown in FIG. 17B, at normal time (at non-irradiation of the artificial sunlight and the attraction light), the insect pests B1" start to be active at sunrise, then gently increase the activity, and rapidly increase the activity substantially 1 hour before the sunset. In addition, the insect pests B1" gradually decrease the highly active state after the sunset, and stop the activity during nighttime (the activity rhythm at that time is indicated by a broken line). When being irradiated with the artificial sunlight at the sunset according to the lighting process, such insect pests B1" misunderstand that it is before the sunset, and thus the active time zone of the insect pests B1" is extended. Then, the irradiation time of the artificial sunlight and the attraction light overlaps the time zone during which the insect pests B1" are highly active.

Therefore, as shown in FIG. 17C, the insect trapping efficiency becomes the highest during a period after the sunset during which the artificial sunlight source units 3 and the attraction light source units 4 operate. The insect trapping efficiency becomes the second highest in the daytime in which the artificial sunlight source units 3 and the attraction light source units 4 are not in operation, and becomes the lowest in the nighttime in which the artificial sunlight source units 3 and the attraction light source units 4 are not in operation.

In the present modification, the irradiation of the artificial sunlight and the attraction light from the sunset to the predetermined time after the sunset causes the active time zone of the insect pests B1" to be extended rather than normal. Thus, the irradiation period of the artificial sunlight and the attraction light overlaps the time zone during which the insect pests B1" are highly active, and hence it is possible to trap insects with increased efficiency. Therefore, with power consumption lower than that in the second modification described above, the number of trapped insects which is close to that in the second modification can be obtained.

It should be noted that the present invention is not limited to the configuration of the embodiment described above, and various modifications are possible according to the purposes of use. For example, the field is not limited to be within the plastic greenhouse H1 and may be an outdoor rice or vegetable field. In addition, each artificial sunlight source unit 3 may include a reflector or the like which absorbs a predetermined wavelength and reflects the other wavelengths. Further, each light source body (discharge lamp 31) may be configured such that wavelength components of the emitted light thereof are the same as those of the artificial sunlight. In this case, a blue LED, a blue fluorescent lamp, or the like can be used as the light source body. Moreover, the artificial sunlight emitted from the artificial sunlight source units 3 may be set such that a radiation energy sum thereof in the wavelength range of 400 to 500 [nm] is greater than radiation energy sums thereof in any other visible light wavelength ranges.

Further, the attraction light source units 4 can also be installed around the plastic greenhouse H1. In addition, each light source unit 41 may include a reflector or the like which absorbs light of a predetermined wavelength range and reflects light in the other wavelength ranges. Further, the spectral characteristic of each discharge lamp 43 may be adjusted such that the emitted light thereof is ultraviolet light having a peak wavelength in a wavelength range of 280 to 380 nm or a radiation energy sum of the emitted light in the wavelength range of 280 to 380 nm is greater than radiation energy sums thereof in any other wavelength ranges. In this case, each discharge lamp 43 can be configured as a fluorescent lamp which emits ultraviolet light. Instead of each discharge lamp 43, an ultraviolet LED having the above spectral characteristic may be provided. According to such a configuration, light in the wavelength range of 280 to 380 nm, namely, ultraviolet light favored by the insect pests B1, can be emitted so as to be more intense than light of the other wavelengths. Thus, the effect of attraction to the attraction light is enhanced, and therefore, the effect of protection against insects is enhanced.

Further, each light source unit 41 may be configured to irradiate only the trap 42 with light. In this case, for example, each discharge lamp 43 is configured as a white light source such as a white fluorescent lamp or a white HID lamp, and each trap 42 reflects and emits only visible light of a wavelength of 500 to 600 [nm] or ultraviolet light of a wavelength of 280 to 380 [nm].

Further, each trap 42 may include an electric shock lattice, a transparent basin which is located on the horizontally put cover 46 and contains water, a suction device which generates airflow near the light emitting surface of the cover 46 to suck in the insect pests B1, or the like.

DESCRIPTION OF THE REFERENCE CHARACTERS 1 insect pest attraction lighting system
2 setting unit
3 artificial sunlight source unit
4 attraction light source unit
B1 diurnal insect pest (insect pest)
H1 plastic greenhouse
P1 plant

The invention claimed is:
1. An insect pest attraction lighting system which is installed in a field and emits attraction light for attracting insect pests to keep the insect pests away from a plant, the insect pest attraction lighting system comprising:
 a setter that sets an operating time zone within a time zone during which the field is not exposed to natural light;
 an artificial sunlight source that irradiates an entirety of the field with artificial sunlight which does not include wavelength components of 500 to 600 nm, in the operating time zone set by the setter;

an attraction light source having a range that irradiates a portion of the field with the attraction light in the operating time zone set by the setter while causing the attraction light to have a peak in a wavelength range of 500 to 600 nm; and an attraction light source support that supports the attraction light source and includes a trap and legs, the trap including a gutter spaced from and below the attraction light source, the gutter being open in an upward direction of the field toward the attraction light source, the gutter being spaced from and above the field in the upward direction of the field by the legs, wherein the artificial sunlight source is supported above at least a portion of the plant in the field, and the attraction light source is supported on the field and extends along and between adjacent ridges in which the plant is planted and emits the attraction light in the upward direction of the field, and the gutter further comprises at least one support member which supports the attraction light source above the gutter for emitting the light in the upward direction of the field.

2. The insect pest attraction lighting system according to claim 1, wherein a radiation energy sum of the attraction light in the wavelength range of 500 to 600 nm is greater than a radiation energy sum of the attraction light in a wavelength range other than 500 to 600 nm.

3. The insect pest attraction lighting system according to claim 1, wherein the artificial sunlight has a peak wavelength in a wavelength range of 400 to 500 nm.

4. The insect pest attraction lighting system according to claim 1, wherein a radiation energy sum of the artificial sunlight in a wavelength range of 400 to 500 nm is greater than a radiation energy sum of the attraction light in a wavelength range other than 400 to 500 nm.

5. The insect pest attraction lighting system according to claim 1, wherein the setter sets, as the operating time zone, an entirety of the time zone during which the field is not exposed to natural light.

6. The insect pest attraction lighting system according to claim 1, wherein the setter sets, as the operating time zone, a time zone which ends at a sunrise time, within the time zone during which the field is not exposed to natural light.

7. The insect pest attraction lighting system according to claim 1, wherein the setter sets, as the operating time zone, a time zone which starts at a sunset time, within the time zone during which the field is not exposed to natural light.

8. The insect pest attraction lighting system according to claim 1, wherein the artificial sunlight source is positioned higher above the field than the attraction light source.

9. The insect pest attraction lighting system according to claim 1, wherein the attraction light source comprises a plurality of attraction light sources that are supported on the field and spaced from one another in a longitudinal direction of the ridges, and each of the plurality of attraction light sources extends in the longitudinal direction of the ridges.

10. The insect pest attraction lighting system according to claim 1, wherein the attraction light source comprises a plurality of discrete light sources extending in a row between the adjacent ridges.

* * * * *